United States Patent Office 2,812,267
Patented Nov. 5, 1957

2,812,267

RESINOUS COMPOSITIONS PLASTICIZED WITH ESTERS OF SULFUR-CONTAINING ALCOHOLS

Philip James Garner, Hooton, Wirral, and Ralph Edward Bowman, Little Chalfont, England, assignors to Shell Development Company, New York, N. Y., a corporation of Delaware No Drawing. Original application February 2, 1950, Serial No. 142,092. Divided and this application March 31, 1954, Serial No. 429,130

Claims priority, application Great Britain February 15, 1949

8 Claims. (Cl. 106—183)

This invention relates to a new class of organic sulfur-containing compounds. More particularly, the invention relates to esters of sulfur-containing alcohols, and to their utilization, particularly as plasticizers and in the preparation of valuable polymeric materials.

Specifically, the invention provides new and valuable esters of alcohols containing at least one sulfinyl and/or sulfonyl radical joined to aliphatic carbon atoms in an open-chain portion of their molecule, and non-aromatic monocarboxylic acids. The invention also provides valuable organic compositions, particularly the cellulose derivatives and vinyl-type polymers, plasticized with the said esters. The invention still further provides valuable and useful polymers of many of the above-described compounds.

It is an object of the invention to provide a new class of organic compounds. It is a further object to provide novel organic sulfur-containing compounds possessing unique properties which make them particularly useful and valuable in industry. It is a further object to provide novel sulfur-containing esters and a method for their preparation. It is a further object to provide a new class of plasticizers for organic compositions. It is still a further object to provide plasticized cellulose derivatives having many improved properties. It is a further object to provide plasticized vinyl-type polymers having good resistance to water and improved strength and flexibility over a wide range of temperatures. It is still a further object to provide polymers of many of the above-described esters. Other objects and advantages of the invention will be apparent from the following detailed description thereof.

It has now been discovered that these and other objects may be accomplished by esters of alcohols containing at least one sulfinyl radical and/or at least one sulfonyl radical joined to aliphatic carbon atoms in an open-chain portion of their molecule, and non-aromatic monocarboxylic acids.

The sulfur-containing alcohols used in producing the novel esters of the invention comprise alcohols containing at least one sulfinyl radical, i. e., a —SO— group, and/or at least one sulfonyl radical, i. e., a —SO$_2$— group, joined to aliphatic carbon atoms in an open-chain portion of their molecule, at least one of said sulfinyl or sulfonyl radicals preferably being not more than six carbon atoms removed from a terminal hydroxyl group. The open-chain portion of the molecule containing the sulfinyl and/or sulfonyl radical or radicals may be saturated or unsaturated and may be further substituted with radicals, such as aliphatic, alicyclic, and heterocyclic radicals, which in turn may be substituted with substituents, such as halogen atoms, alkoxy radicals, and the like. Illustrative examples of these alcohols are 2-propylsulfinylethanol, i. e., C$_3$H$_7$SOC$_2$H$_4$OH, 2-butylsulfonylethanol, 3-amylsulfonylpropanol, 3-butylsulfinylpropanol, 3-hexylsulfonylbutanol, 5-isohexylsulfinylhexanol, 3-dodecylsulfonylpropanol, 3-cyclohexylsulfonylpropanol, 3-chlorobutylsulfonylpropanol, 4-octylsulfonylbutenol, 3,6-disulfonylheptanol, i. e., CH$_3$SO$_2$C$_2$H$_4$SO$_2$C$_2$H$_4$OH, 3,7-disulfonyldodecanol, 3-sulfonyl-7-sulfinyldecanol, 4,4'-sulfonyldioctanol, 3,5-disulfonyloctanediol-1,8, 3,3'-sulfonyldipropanol, 3-cyclopentylsulfinylpropanol, 2-chlorohexylsulfonylbutanol, 3-cyclopentenylsulfinylbutenol, 3,3'-sulfonyldihexanol and 3-acetoxyhexylsulfonylbutanol.

The preferred sulfur-containing alcohols to be used in preparing the novel esters are the sulfinyl or sulfonyl-substituted monohydric alcohols containing not more than 25 carbon atoms wherein from 1 to 3 non-adjacent methylene groups joined to aliphatic carbon atoms in an open-chain portion of the alcohol molecule have been replaced by a sulfinyl radical or a sulfonyl radical, and sulfinyl or sulfonyl-substituted dihydric alcohols containing not more than 25 carbon atoms wherein from 1 to 3 non-adjacent methylene groups joined to aliphatic carbon atoms in an open-chain portion of the alcohol molecule have been replaced by a sulfinyl radical or a sulfonyl radical. Examples of these preferred alcohols are 3-amylsulfonylpropanol, 2-allylsulfonylbutanol, 2-butylsulfonylethanol, 3-cyclohexylsulfinylhexanol, 2-methallylsulfonylbutanol, 4-cyclohexylsulfonylheptenol, 3,5-disulfonyloctanol, 2,4,6-trisulfonyldodecanol, 3,3'-sulfonyldipropanol, 3,4-disulfonyloctanediol-1,8, 4,4'-sulfonyldioctanol, 3,7-disulfonyldodecanol, and 8-butylsulfonyltetracosanol.

Particularly preferred sulfur-containing alcohols are the sulfonyl-substituted monohydric alcohols containing not more than 18 carbon atoms wherein from 1 to 3 non-adjacent methylene groups joined to aliphatic carbon atoms in an open-chain portion of the alcohol molecule have been replaced by a sulfonyl radical.

Especially preferred sulfur-containing alcohols are those of the general formula R$_1$SO$_2$R$_2$OH wherein R$_1$ is a hydrocarbon radical joined to the sulfonyl radical through an aliphatic carbon atom and containing from 1 to 15 carbon atoms, and R$_2$ is a bivalent aliphatic hydrocarbon radical containing from 1 to 8 carbon atoms, said alcohols containing not more than 18 carbon atoms.

Coming under special consideration, particularly because of the ability of their esters to undergo polymerization with themselves or other polymerizable compounds, are the alcohols of the above-described general formula wherein R$_1$ and/or R$_2$ contain at least one polymerizable unsaturated linkage, e. g., an ethylenic linkage.

The above-described sulfur-containing alcohols may be prepared by any suitable method. They are preferably prepared by oxidizing the corresponding thioether alcohols. Complete oxidation of the thio groups produces the sulfonyl alcohols, while partial controlled oxidation produces the corresponding sulfinyl alcohols.

The oxidation of the thioether alcohols may be effected by any of a large number of oxidizing agents, such as hydrogen peroxide, sodium perbenzoate, permanganates, bromine, fuming nitric acid, chromic acid, and perbenzoic acid. The oxidation may also be effected by treating the thioether alcohols with molecular oxygen, preferably in the presence of catalysts. The amount of the oxidizing agent to be employed will vary over a considerable range. If the sulfinyl alcohol is the desired product it is generally desirable to react the thioether alcohol with an approximate chemical equivalent amount of the oxidizing agent. As used throughout the specification and claims in relation to oxidation of thioether alcohols the expression "chemical equivalent amount" refers to the amount of agent necessary to furnish one atom of oxygen for every thioether linkage to be oxidized. Preferably, the thioether alcohol and agent are reacted in chemical equivalent ratios of 1:1 to 1:1.5, respectively. If the sulfonyl alcohol is the desired product it is generally desirable to react the thioether alcohol with at least twice the chemical equivalent amount of oxidizing agent. Preferably, the thioether alcohol and agent are reacted in chemical equivalent ratios of 1:2 to 1:2.5, respectively.

The oxidation may be accomplished in the presence or absence of solvents or diluents. Examples of suitable diluents are glacial acetic acid, acetone, benzene, toluene, xylene, and the like.

The temperature employed during the oxidation may vary over a considerable range depending upon the type of reactants and oxidizing agents employed. It is generally desirable to maintain the temperature between 50° C. and 150° C., preferably between 60° C. and 100° C. Cooling may be employed if necessary. Atmospheric, superatmospheric or subatmospheric pressures may be employed as desired.

The sulfinyl alcohols and sulfonyl alcohols may be recovered from the reaction mixture by any convenient means known to the art, such as extraction, distillation, fractional precipitation, and the like.

The thioether alcohols used in the above-described process may be prepared by a variety of methods. They may be prepared by reacting an organic halide with a sulfhydryl-substituted alcohol, or alternatively by reacting a sulfhydryl-substituted compound with a halo-substituted alcohol. They may also be prepared by reacting a sulfhydryl-substituted compound with a keto-alcohol or an aldehyde-alcohol. They may also be prepared by reacting a sulfhydryl-substituted compound, such as a mercaptan, hydrogen sulfide, or a polythiol, with an unsaturated alcohol, such as allyl alcohol and methallyl alcohol, in the presence of an activating agent, such as ultraviolet light, peroxide catalysts, basic catalysts, and the like.

The thioether alcohols are preferably prepared by reacting a mercaptan with an alkylene oxide or an alkylene halohydrin, preferably in the presence of a catalyst, such as a caustic aqueous solution, sodium methylate, and the like. Mercaptans used in this reaction may be exemplified by ethyl mercaptan, butyl mercaptan, allyl mercaptan, amyl mercaptan, and cyclohexanethiol. The term "alkylene oxide" as used herein is intended to include formaldehyde. The alkylene oxides or alkylene halohydrins that may be used for this reaction may be exemplified by formaldehyde, ethylene oxide, propylene oxide, amylene oxide, ethylene chlorohydrin, and propylene bromohydrin. A more detailed description of the reaction of mercaptans with halohydrins may be found in Ellis's "Chemistry of Petroleum Derivatives," vol. 2 (1937), page 526.

The monocarboxylic acids used in producing the novel esters are free of any aromatic ring structures. They may be saturated or unsaturated, and may be aliphatic, alicyclic or heterocyclic. They may also be substituted if desired with non-interfering substituents, such as halogen atoms, alkoxy radicals, and the like. Illustrative examples of these acids are acetic, propionic, caproic, butyric, valeric, enanthic, acrylic, caprylic, methacrylic, pelargonic, capric, hendecanoic, lauric myristic, palmitic, stearic, arachidic, angelic, sorbic, hydrosorbic, 2-octenoic 2,8 - decadienoic, 2,5 - heptadienoic, cyclohexanoic, cyclopentenoic, butylcyclohexanoic, cyclohexenoic, picolinic, beta-ketobutyric, beta-ketoheptanoic, 2,5 - dichloroheptanoic, 2-nitropentanoic, 3-hydroxypentanoic, 4-acetoxyhexanoic, cyclohexaneacetic and chlorocyclohexanoic.

Preferred acids to be used in producing the novel esters are the non-aromatic monocarboxylic acids containing at least three carbon atoms, and preferably from 3 to 25 carbon atoms, such as acrylic methacrylic, butyric, caproic, 2-ethylhexanoic, caprylic, pelargonic, capric, palmitic, stearic, naphthenic, butylcyclohexanoic, beta-ketoheptanoic, octenoic and 2,6-dodecadienoic acid.

Particularly preferred acids to be used in producing the novel esters are the non-aromatic monocarboxylic acids containing from 3 to 18 carbon atoms. An especially preferred group of these acids because of the ability of their esters to act as exceptionally fine plasticizers are the saturated monocarboxylic acids containing from 6 to 18 carbon atoms, such as caproic acid, enanthic acid, cyclohexanoic acid, caprylic acid, capric acid, lauric acid, chloromyristic acid, and palmitic acid. Also of special interest because of the ability of their esters to undergo polymerization are the unsaturated monocarboxylic acids containing from 3 to 18 carbon atoms, such as acrylic acid, methacrylic acid, 3-pentenoic acid, chloroacrylic acid, 2,5-heptadieneoic acid, and 3,10-octadecadienoic acid.

The esters of the invention are theoretically obtained by esterifying any one of the above-described acids or anhydrides thereof with any one of the above-described sulfur-containing alcohols. If the alcohols are polyhydric just one of the hydroxyl groups may be esterified with the above-described acids, or two or more of the hydroxyl groups may be esterified with one or a mixture of the said acids. Examples of the novel esters of the invention are 2-butylsulfonylethyl acetate, 3-hexylsulfinylbutyl valerate, 3-amylsulfonyloctyl ketobutyrate, 2-propylsulfonylethyl naphthenate, 2-allylsulfonylethyl acrylate, 2-butylsulfonylethyl stearate, 3-amylsulfinyl butyl caprylate, 3-cyclohexylsulfinyl propyl pelargonate, 2-butylsulfonyl ethyl laurate, 3,6-disulfonylheptyl sorbate, 3-dodecylsulfonylpropyl tetrolate, 3-chlorobutylsulfonylpropyl palmitate, 3 - sulfonyl - 7 - sulfinyldecyl caprylate, 3,3' - sulfonyldipropanol dicaproate, 4,4' - sulfonyldihexanol dilaurate, 3,3' - sulfonyldipropanol acetate valerate, 2-chlorobutylsulfonylethyl chloroacetate and 4 - cyclohexylsulfonylpropyl stearate.

The preferred esters of the invention, i. e., those prepared from the preferred sulfur-containing alcohols and the preferred acids, may be illustrated by 2 - allylsulfonylethyl butyrate, 3 - amylsulfonylpropyl stearate, 2 - propylsulfonylethyl naphthenate, 2 - propylsulfonylbutyl methylcyclohexanoate, 2 - butylsulfonylethyl laurate, 2-chlorohexylsulfonylbutyl myristate, and 3 - decylsulfonylhexyl sorbate.

The novel esters of the invention may be prepared by a variety of methods. They may be prepared, for example, by reacting the alcohols containing the sulfinyl and/or sulfonyl radical or radicals with the desired acids or anhydrides, by reacting these sulfur-containing alcohols with an acid chloride in pyridine, by an ester exchange reaction wherein ester derivatives of either the aforedescribed sulfur-containing alcohols or the desired acids are reacted with the free alcohols or acids or their esters in the presence of an ester-exchange catalyst, or alternatively by reacting the corresponding thioether alcohol with the desired acid and subsequently oxidizing the resulting ester to the desired sulfinyl or sulfonyl form, or still further by reacting an unsaturated alcohol with the desired acid, adding a mercaptan, hydrogen sulfide or a polythiol thereto and subsequently oxidizing the resulting thio-substituted ester to the desired sulfinyl or sulfonyl form.

The direct esterification of the alcohols containing the sulfinyl and/or sulfonyl radical or radicals with the acids or anhydrides, or the esterification of thio alcohols or the unsaturated alcohols with the desired acids as described above is preferably accomplished by heating the alcohols and acids together in the presence of an esterification catalyst and removing the water formed during the reaction, preferably by distillation. Examples of catalysts that may be used in this type of reaction are p-toluenesulfonic acid, ethylsulfonic acid, hydrobromic acid, chloroacetic acid, sulfuric acid, benzenesulfonic acid, formic acid, boron and silicon fluorides, acid salts, such as monosodium and monopotassium sulfates, and salts of strong acids and weak bases, such as aluminum sulfate, zinc chloride, zinc sulfate, and the like. The amount of the catalyst employed will vary over a wide range depending upon the particular type of reactants, catalyst, and reaction conditions employed. In most cases, the amount of catalyst will vary between 0.1% to 5% by weight of reactants.

The amount of acid and alcohol to be utilized in the reaction will vary over a considerable range depending upon the type of product desired. In general, the acids are reacted with at least a chemical equivalent amount of the alcohol. As used throughout the specification and claims in relation to esterification the expression "chemical equivalent amount" is meant the amount of reactant necessary to furnish approximately one hydroxyl group for every carboxyl group to be esterified. Preferably the acid and alcohol are reacted in chemical equivalent ratios varying from 1:1 to 1:5, respectively.

The esterification may be accomplished in the presence or absence of solvents or diluents. In case solvents or diluents are desired, organic compounds, such as benzene, toluene, cyclohexane, xylene, and mixtures thereof, which do not interfere with the reaction, may be utilized.

In case the esters to be produced are susceptible to polymerization and it is desired to maintain such esters in the monomeric form it is usually advisable to employ a polymerization inhibitor in the reaction mixture. Examples of such inhibitors are copper bronze powder, sulfur, p-phenylenediamine, hydroquinone, tannic acid and various amino and sulfur compounds. The inhibitors may be subsequently removed by washing, distillation, extraction, and the like.

The temperature employed in the esterification process may vary over a considerable range. In general, temperatures varying between about 70° C. and 200° C. are preferred. Particularly preferred temperatures range from 80° C. to 100° C. Higher or lower temperatures may be utilized, however, if desired or necessary. Atmospheric, superatmospheric, or subatmospheric pressures may be employed.

The separation of the esters formed in the reaction may be accomplished by any suitable means, such as extraction, distillation, fractional precipitation, and the like.

If the esters are prepared by reacting a thioether alcohol with the desired acid and oxidizing the resulting ester to the sulfinyl or sulfonyl form, or by reacting an unsaturated alcohol with the acid, adding a mercaptan, hydrogen sulfide or a polythiol, and subsequently oxidizing the resulting thio-substituted ester, the oxidation may be accomplished by the method described hereinabove for the production of the alcohols containing the sulfinyl and/or sulfonyl radical or radicals from the corresponding thioether alcohols. The addition of the mercaptan, hydrogen sulfide or a polythiol to the unsaturated ester may be accomplished by the method described hereinabove for the addition of the mercaptans to the unsaturated alcohols.

The novel esters of the invention possess many unique properties which make them particularly useful and valuable in industry. They may be used, for example, as lubricating oils and additives therefor, asphalt adhesive agents, water-proofing agents for inorganic gel greases, thickening agents or viscosity index improvers, solvents, rubber preservatives, vulcanizing accelerators, additives for insecticidal and germicidal compositions, textile lubricants, additives for dye preparations, wetting agents, dispersing agents for oils, detergents, polishes, and the like. The esters are also valuable softeners and plasticizers for resinous compositions, such as the casein and other protein plastics, lignin plastics, synthetic linear polyamides, phenol-aldehyde type resins, urea-aldehyde type resins, and the like.

The esters containing a polymerizable unsaturated linkage in the alcohol or acid portion of their molecule are able to undergo polymerization with themselves or with other polymerizable unsaturated organic compounds, preferably those containing at least one $CH_2=C=$ group in their molecule, such as acrylonitrile, styrene, methyl methacrylate, vinyl chloride, etc., to produce valuable polymeric materials. The polymers of the esters may be prepared by any suitable method, such as exposing the monomer or monomers in bulk, solvent solution, or aqueous emulsion or suspension, to light, heat, and/or polymerization catalysts, such as benzoyl peroxide, tertiary-butyl peroxide, acetyl peroxide, diacetyl peroxide, hydrogen peroxide, and the like. The resulting polymers are valuable as plasticizers and as ingredients for the preparation of surface coating compositions, rigid plastic articles, and the like.

The novel esters are particularly valuable as plasticizers for the cellulose derivatives. When utilized in this capacity they form compounded compositions having many superior properties, such as improved processability and flexibility and improved resistance to exterior elements. Cellulose derivatives that may be plasticized with these novel esters may be exemplified by cellulose nitrate, cellulose acetate, cellulose acetate butyrate, cellulose propionate, cellulose isobutyrate, cellulose crotonate, cellulose acetobutyrate, cellulose stearate, and cellulose valerate, ethyl cellulose, methyl cellulose, butyl cellulose, benzyl cellulose, glycol cellulose, cellulose aceto-stearate, cellulose aceto-propionate, cellulose aceto-tartrate, and mixtures thereof.

A single ester may be used as a plasticizer for these derivatives or a mixture of two or more may be utilized. The amount of the esters to be incorporated with the above-described cellulose derivatives may vary over a considerable range depending upon the particular type of ester and the intended use of the finished product. In most cases the amount of the plasticizer added will vary from about 5 parts to 150 parts by weight for every 100 parts of cellulose derivative. A more preferred range comprises 20 to 75 parts of plasticizer per 100 parts of cellulose derivative.

If the cellulose derivatives are to be used for the preparation of surface coating compositions the esters may be incorporated therewith by adding the said ester and the cellulose derivative to the solvent employed in the preparation of the coatings, such as acetone, butyl acetate, ethylene glycol ethyl ether, toluene, and the like, or mixtures thereof. If the cellulose derivatives are to be used for the preparation of plastic sheets the plasticizers may be incorporated therein by kneading or rolling the two ingredients together by the conventional methods.

Modifiers and other compounds may be added to the cellulose derivatives along with, or before, the addition of the novel esters. Quantities of the conventional plasticizers, such as dioctyl phthalate and dibutyl phthalate may also be added with the novel esters.

The plasticized cellulose compositions described above may be utilized for a great variety of purposes in industry. They may be used, for example, in the preparation of lacquers for coating wood, paper, and metals, in the preparation of dopes for coating fabrics, in varnishes and paints, and in plastic compositions utilized in the preparation of rigid articles, sheets, tubes, rods, and the like.

The novel esters and particularly those of the saturated monocarboxylic acids containing from 6 to 18 carbon atoms are also valuable as plasticizers for the vinyl-type polymers, such as polyvinyl chloride, and when used in this capacity produce plasticized compositions possessing improved properties, such as good tensile strength and flexibility over a wide range of conditions and improved resistance to shrinkage and deterioration after prolonged periods of exposure to high temperatures.

Vinyl-type polymers that may be plasticized with the above-described compounds are the homopolymers, copolymers and interpolymers of the vinyl-type monomers. Vinyl-type monomers include all those organic compounds containing at least one $CH_2=C=$ group in their molecule. Examples of the vinyl-type monomers are styrene, alpha-methylstyrene, dichlorostyrene, vinyl naphthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride, vinylidene bromide and vinylidene fluoride; the vinyl esters of the inorganic acids, such as the halogen acids and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl valerate, and vinyl caproate; the vinyl esters of the polycarboxylic acids, such as divinyl succinate, divinyl adipate, vinyl allyl phthalate, vinyl methallyl pimelate, and vinyl methyl glutarate; the vinyl esters of the unsaturated acids, such as vinyl acrylate, vinyl crotonate, and vinyl methacrylate; the vinyl ethers, such as vinyl ethyl ether, vinyl butyl ether, and vinyl allyl ether, and the vinyl ketones, such as vinyl butyl ketone, and vinyl ethyl ketone.

A preferred group of vinyl-type polymers to be plasticized with the novel esters of the invention are the vinyl halide polymers. The expression "vinyl halide polymer" refers to those polymers containing a predominant quantity, i. e., at least 60% by weight, of a vinyl halide as vinyl chloride and vinyl bromide. Examples of this preferred group of polymers are polyvinyl chloride, polyvinyl bromide, copolymers of vinyl chloride and vinyl acetate, copolymers of vinyl chloride and vinylidene bromide, copolymers of allyl chloride and vinyl chloride, copolymers of vinyl chloride and methyl methacrylate, and copolymers of vinyl chloride and vinyl propionate.

A single ester may be used as a plasticizer or a mixture of two or more of the esters may be utilized. In addition, the novel esters may be used as plasticizers in combination with other plasticizers, such as dioctyl phthalate, dibutyl phthalate, tricresyl phosphate, and the like.

The amount of the novel esters to be incorporated with the above-described vinyl polymers may vary over a considerable range depending upon the particular type of polymer to be plasticized, the intended use of the resulting composition, etc. In most cases the amount of the plasticizer will vary from about 20 to 150 parts by weight for every 100 parts by weight of resin. A more preferred range of plasticizer to be utilized comprises 40 parts to 75 parts by weight of plasticizer for every 100 parts by weight of resin.

Fillers and pigments such as whiting, channel black, clay, gum rosin, silica and others, and stabilizers, such as litharge, other lead compounds, some oxides of the bismuth and barium types and some silicates may be added to the polymers along with the novel esters of the invention.

The polymer and plasticizer may be compounded together by means of conventional equipment such as mills of the heated roll type or internal mixers. The plasticizer and other compounding ingredients, such as fillers and stabilizers, are worked into the polymer so that they are thoroughly dispersed therein by means of such equipment and the resulting composition then molded, calendered, extruded or otherwise formed into articles of the desired shape by conventional procedure.

To illustrate the manner in which the invention may be carried out the following examples are given. It is to be understood, however, that the examples are for the purpose of illustration and the invention is not to be regarded as limited to any of the specific conditions recited therein. Unless otherwise specified parts described in the examples are parts by weight, the relation between the parts by weight and the parts by volume being that of the kilogram to the litre.

*Example I*

830 parts of a propyl mercaptan fraction obtained by the distillation of crude petroleum mercaptans was passed into a reaction vessel and 1750 parts by volume of a 25% aqueous sodium hydroxide solution was slowly added. Considerable heat was evolved in this process and the alkali was added at such a rate as to avoid boiling of the organic layer. 886 parts of ethylene chlorohydrin was added to the stirred reaction mixture. At the end of the reaction the oily layer was separated and washed successively with 25% caustic soda solution, water, 1% hydrochloric acid, and water. The product was dried and distilled under 15 mm. pressure. The product boiling at 75° to 130° was collected and re-distilled to yield substantially pure 2-propylthioethanol.

110 parts of 2-propylthioethanol was dissolved in 200 parts by volume of glacial acetic acid and 210 parts of a 30% solution of hydrogen peroxide was added thereto with stirring at such a rate as to keep the reaction mixture below 95° C., cooling being used if necessary. Heat was applied to keep the mixture at 90° C. where it was kept for one hour, and then taken up to 100° C. where it was kept for a further half hour. The whole reaction mixture was then distilled under 15 mm. pressure up to a bath temperature of 150° C., to remove acetic acid and water. The residue is then distilled under 0.2 mm. pressure and the fraction boiling between 130° C. and 132° C. was collected. The product 2-propylsulfonylethanol was a water-white viscous oil readily soluble in water.

A mixture of 60 parts of 2-propylsulfonylethanol so obtained, 102 parts of acetic anhydride and 25 parts of concentrated sulfuric acid was heated on a boiling water bath for an hour. The mixture was cooled and 50 parts of crushed ice added. The mixture was then shaken, allowed to come to room temperature, and the aqueous layer removed. The resulting product was washed with water, dried and distilled at 115° C. and 125° C. (0.2 mm.) to yield 2-propylsulfonylethylacetate a colorless liquid.

*Example II*

15 parts of 2-propylsulfonylethanol is mixed with 50 parts by volume of benzene and 14 parts of pelargonyl chloride. 8.5 parts of dry pyridine is added with cooling. A vigorous reaction takes place and pyridine hydrochloride precipitates out. The mixture is left at room temperature for one fourth of an hour and then heated on a boiling water bath. The reaction mixture is cooled and washed successively with water, 1% hydrochloric acid and water. After drying the benzene is removed under reduced pressure and the residue distilled. The resulting product is 2-propylsulfonylethyl pelargonate.

*Example III*

2-butylthioethanol was produced by reacting n-butyl mercaptan with ethylene chlorohydrin by a process similar to the one used in Example I. 100.5 parts of the 2-butylthioethanol was dissolved in 200 parts by volume of glacial acetic acid, and 200 parts by volume of a 30% aqueous solution of hydrogen peroxide was added with stirring at such a rate as to keep the reaction mixture below 95° C., cooling being applied as necessary. As the temperature began to fall gentle heating was applied to keep the reaction mixture at 90° C. for a period of about one hour. The temperature was then raised to 100° C. for another half hour. The whole reaction mixture was then distilled at 50 mm. pressure up to a batch temperature of 150° C. to remove acetic acid and water and the residue distilled under 0.2 mm. pressure and the fraction boiling between 144° C. and 147° C. collected. The product, 2-butylsulfonylethanol, was a water-white oil which slowly crystallized on standing.

A mixture of 64 parts of 2-butylsulfonylethanol and 103 parts of naphthenic acids (equivalent weight=257), 150 parts by volume of benzene and 1 part by volume of concentrated sulfuric acid were refluxed in a vessel fitted with a Dean and Stark attachment until no more water was evolved. The reaction mixture was then washed and dried as in Example I. The dry solution was heated at about 100° C. for half an hour with 10 parts of M. R. C. earth. The earth was removed by filtration and the benzene removed by distillation under reduced pressure. The product, 2-butylsulfonylethyl naphthenate, was an amber oil.

Example IV

About 82 parts of 2-butylsulfonylethanol is mixed with about 75 parts of 2-ethylhexoic acid, 200 parts of toluene and 1.25 parts of p-toluenesulfonic acid and the resulting mixture heated under reflux until the theoretical amount of water is collected. Distillation of the resulting product yields 2-butylsulfonylethyl 2-ethylhexoate.

Example V

About 57 parts of allyl alcohol and 115 parts of amyl mercaptan are placed in a flask equipped with a reflux condenser and mechanical stirrer. The mixture is rapidly stirred and irradiated with ultraviolet light at 100° C. to 135° C. for several hours. The reaction mixture is then distilled to produce 3-amylthiopropanol.

About 125 parts of the 3-amylthiopropanol is dissolved in 200 parts by volume of glacial acetic acid, and 200 parts by volume of a 30% aqueous solution of hydrogen peroxide is added with stirring at such a rate as to keep the reaction mixture below 95° C. cooling being applied as necessary. As the temperature begins to fall gentle heating is applied to keep the reaction mixture at 90° C. The acetic acid and water are then removed and the residue distilled to yield 3-amylsulfonylpropanol.

97 parts of 3-amylsulfonylpropanol is combined with 50 parts of acrylic acid, 5 parts of hydroquinone and 100 parts of toluene. The apparatus is swept out with carbon dioxide and 0.3 part of concentrated sulfuric acid added. The mixture is then heated to reflux. The water formed is removed by azeotropic distillation with the toluene. When no further water separates the reaction mixture is diluted with 2000 parts of benzene, treated with decolorizing charcoal, and washed with water. Distillation of the mixture produces 3-amylsulfonylpropyl acrylate.

Example VI

A portion of the 3-amylthiopropanol produced in Example V is partially oxidized to form 3-amylsulfinylpropanol. 90 parts of this alcohol is combined with 90 parts of lauric acid and 125 parts of toluene. The apparatus is swept out with carbon dioxide and 0.3 part of concentrated sulfuric acid added. The mixture is then heated to reflux with a slow stream of carbon dioxide being passed through the reaction chamber. The water formed is removed by azeotropic distillation with the toluene. When no further water separates the mixture is washed as in Example V and distilled to produce 3-amylsulfinylpropyl laurate.

Example VII 3,3'-sulfonyldipropanol is produced by adding hydrogen sulfide to allyl alcohol and oxidizing the resulting thioether alcohol by the method shown in Example V. About 98 parts of this alcohol is reacted with 75 parts of caproic acid in 150 parts of toluene. The apparatus is swept out with carbon dioxide and 0.3 part of concentrated sulfuric acid added. The mixture is then heated to reflux with a slow stream of carbon dioxide being passed through the reaction chamber. When no further water separates the mixture is distilled to produce 3,3'-sulfonyldipropanol dicaproate.

Example VIII 2-allylsulfonylethanol is produced by reacting allyl mercaptan with ethylene chlorohydrin by a process similar to the one described in Example I. About 100 parts of 2-allylsulfonylethanol is added to 50 parts of butyric acid in 100 parts of toluene. The apparatus is swept out with carbon dioxide and 0.3 part of concentrated sulfuric acid added. The mixture is then heated to reflux. When no further water separates the mixture is distilled to produce 2-allylsulfonylethyl butyrate.

Example IX 4,7-disulfonyldecanediol-1,10 is produced by reacting ethanedithiol with allyl alcohol in the presence of ultraviolet light and oxidizing the resulting product. 125 parts of this alcohol is then reacted with 72 parts of caprylic acid in 200 parts of toluene. The apparatus is swept out with carbon dioxide and 0.3 part of concentrated sulfuric acid added. The mixture is then heated to reflux with a slow stream of carbon dioxide being passed through the reaction chamber. When no further water separates the mixture is distilled to produce 4,7-disulfonyldecanediol-1,10 dicaprylate.

Example X

About 100 parts of polyvinyl chloride and 40 parts of 2-butylsulfonylethyl naphthenate were milled together at 150° C. for 5 minutes and pressed at 150° C. for 3 minutes. The resulting composition possessed improved resistance to shrinkage and deterioration after prolonged periods of exposure to high temperatures, good resistance to water and good tensile strength and flexibility over a wide range of temperatures.

Example XI

About 100 parts of polyvinyl chloride, 50 parts of 2-butylsulfonyethyl 2-ethylhexoate and 5 parts of white lead are mixed together at 150° C. for five minutes and pressed at 150° C. for three minutes. The resulting composition has good strength, color and flexibility.

Example XII

A solution of 10% 3-amylsulfonylethyl acrylate and 90% by weight of methacrylonitrile is prepared and 2% by weight of benzoyl peroxide added. After heating at 65° C. a clear hard resin is obtained.

Example XIII

About 100 parts of 3-allylsulfonylpropyl butyrate is heated with 5 parts of benzoyl peroxide. The resulting composition is a hard, brittle resin.

Example XIV

A coating composition is prepared by mixing one part of 2-propylsulfonylethyl acetate with one part of nitrocellulose in a solvent comprising 19% vol. percent n-butyl acetate, 19 vol. percent ethyl acetate, 12 vol. percent butyl alcohol, 30 vol. percent toluene and 20 vol. percent low aromatic petroleum lacquer diluent. Tin panels are coated with this composition and dried under constant temperature and humidity. The coatings show good strength and flexibility and resistance to inclement weather conditions.

Example XV

A coating composition is prepared as shown in the preceding example using 2-butylsulfonylethyl naphthenate as the plasticizer. Coatings of the resulting composition on tin panels show good strength and flexibility and resistance to weather conditions.

This application is a division of our application Serial No. 142,092, filed February 2, 1950, now abandoned.

We claim as our invention:

1. A plasticized composition containing 100 parts by weight of polyvinyl chloride and 20 parts to 150 parts by weight of 2-butylsulfonyethyl naphthenate.

2. A plasticized composition containing 100 parts by weight of polyvinyl chloride and 20 parts to 150 parts by weight of 2-butylsulfonylethyl 2-ethylhexoate.

3. A plasticized composition containing 100 parts by weight of a vinyl halide polymer and 20 parts to 150 parts by weight of an ester of (1) a sulfonyl-substituted monohydric alcohol of the formula $R_1SO_2R_2OH$ wherein $R_1$ is a hydrocarbon radical joined to the sulfonyl radical through an aliphatic carbon atom and containing from 1 to 15 carbon atoms and $R_2$ is a bivalent aliphatic hydrocarbon radical containing from 1 to 8 carbon atoms, said alcohol containing no more than 18 carbon atoms, and (2) an aliphatic saturated hydrocarbon monocarboxylic acid containing from 6 to 18 carbon atoms.

4. A plasticized composition comprising a polymer of a monomer containing at least one $CH_2=C=$ group in its molecule and as a plasticizer therefor an ester of (1) an alcohol of the formula $R_1SO_2R_2OH$ wherein $R_1$ is a hydrocarbon radical joined to the sulfonyl radical through an aliphatic carbon atom and containing from 1 to 15 carbon atoms and $R_2$ is a bivalent aliphatic hydrocarbon radical containing from 1 to 8 carbon atoms, said alcohol containing no more than 18 carbon atoms, and a monocarboxylic acid of the group consisting of aliphatic hydrocarbon monocarboxylic acids and cycloaliphatic hydrocarbon monocarboxylic acids all such acids containing no more than 18 carbon atoms each.

5. A plasticized composition comprising 100 parts of nitrocellulose and 20 parts to 75 parts of 2-propylsulfonylethyl acetate.

6. A plasticized composition comprising a cellulose ester and as a plasticizer therefor an ester of (1) an alcohol of the formula $R_1SO_2R_2OH$ wherein $R_1$ is a hydrocarbon radical joined to the sulfonyl radical through an aliphatic carbon atom and containing from 1 to 15 carbon atoms and $R_2$ is a bivalent aliphatic hydrocarbon radical containing from 1 to 8 carbon atoms, said alcohol containing no more than 178 carbon atoms, and an aliphatic saturated hydrocarbon monocarboxylic acid containing from 6 to 18 carbon atoms.

7. A plasticized composition comprising 100 parts by weight of a vinyl halide polymer and from 20 parts to 150 parts by weight of an ester of an alcohol of the formula $R_1SO_2R_2OH$ wherein $R_1$ is a hydrocarbon radical joined to the sulfonyl radical through an aliphatic carbon atom and containing from 1 to 15 carbon atoms and $R_2$ is a bivalent aliphatic hydrocarbon radical containing from 1 to 8 carbon atoms, said alcohol containing no more than 18 carbon atoms, and an aliphatic saturated hydrocarbon monocarboxylic acid containing from 3 to 18 carbon atoms.

8. A plasticized composition comprising a polymeric material of the group consisting of cellulose ethers and esters and polymers of monomers containing at least one $CH_2=C=$ group, and as a plasticizer therefor an ester of (1) an alcohol of the formula $R_1XR_2OH$ wherein X is a member of the group consisting of —SO— and —SO$_2$— radicals, $R_1$ is a hydrocarbon radical joined to the X radical through an aliphatic carbon atom and containing from 1 to 15 carbon atoms and $R_2$ is a bivalent aliphatic hydrocarbon radical containing from 1 to 8 carbon atoms, said alcohol containing no more than 18 carbon atoms, and a monocarboxylic acid of the group consisting of aliphatic hydrocarbon monocarboxylic acids and cycloaliphatic hydrocarbon monocarboxylic acids all such acids containing no more than 18 carbon atoms each.

References Cited in the file of this patent

UNITED STATES PATENTS

| | | |
|---|---|---|
| 2,127,400 | Gibbs | Aug. 16, 1938 |
| 2,356,586 | Hentrich et al. | Aug. 22, 1944 |
| 2,536,498 | Fraser | Jan. 2, 1951 |